(12) United States Patent
Aviel

(10) Patent No.: US 8,621,996 B2
(45) Date of Patent: Jan. 7, 2014

(54) ENGRAVING OF PRINTING PLATES

(75) Inventor: David Aviel, Tel Mond (IL)

(73) Assignee: Eastman Kodak Company, Rochester, NY (US)

( * ) Notice: Subject to any disclaimer, the term of this patent is extended or adjusted under 35 U.S.C. 154(b) by 1244 days.

(21) Appl. No.: 11/845,141

(22) Filed: Aug. 27, 2007

(65) Prior Publication Data
US 2009/0057268 A1  Mar. 5, 2009

(51) Int. Cl.
*B41C 1/05* (2006.01)
(52) U.S. Cl.
USPC ........................................ 101/401.1; 347/259
(58) Field of Classification Search
None
See application file for complete search history.

(56) References Cited

U.S. PATENT DOCUMENTS

| | | | |
|---|---|---|---|
| 3,832,948 | A | 9/1974 | Barker |
| 6,150,629 | A | 11/2000 | Sievers |
| 6,857,365 | B2 | 2/2005 | Juffinger et al. |
| 2003/0222969 | A1 | 12/2003 | Detmers et al. |
| 2006/0249491 | A1 | 11/2006 | Jurgensen |

FOREIGN PATENT DOCUMENTS

| | | |
|---|---|---|
| EP | 1 262 316 A1 | 12/2002 |
| EP | 1 700 691 A1 | 9/2006 |
| WO | WO 2007/117477 A2 | 10/2007 |
| WO | WO 2007/149208 A2 | 12/2007 |
| WO | WO 2008/088504 A1 | 7/2008 |

*Primary Examiner* — Joshua D Zimmerman
(74) *Attorney, Agent, or Firm* — Nelson Adrian Blish

(57) ABSTRACT

An optical imaging apparatus (80) for direct engraving of flexographic plates (52) includes at least two laser sources (43), each emitting laser beams (44). A mirror or prism (45) is placed in front of each of the laser sources to alter an optical path of each of the laser beams. The laser beams cut the flexographic plate at different depths and cut out chunks (65) of the flexographic plate.

7 Claims, 8 Drawing Sheets

ENGRAVING OF PRINTING PLATES

CROSS REFERENCE TO RELATED APPLICATIONS

Reference is made to commonly-assigned U.S. patent application Ser. No. 11/353,217, now U.S. Pat. No. 7,419,766, filed Feb. 13, 2006, titled FLEXOGRAPHIC PRINTING PLATE PRECURSOR AND IMAGING METHOD, by Kimelblat et al., the disclosure of which is incorporated herein.

FIELD OF THE INVENTION

This invention relates to an optical printing head and methods, for direct engraving of sensitive printing blocks. This is achieved by utilizing high power laser sources.

BACKGROUND OF THE INVENTION

Direct engraving of printing blocks such as flexographic plate or gravure cylinders requires carving three-dimensional (3D) images on plate material directly with a laser system. This is significantly different from two dimensional imaging techniques which require post processing steps to produce the three-dimensional features.

This difference introduces several challenges for a laser imaging system for flexographic plates: the laser system must have sufficient power to ablate the material, and the laser spot should be small enough to achieve the fine detail required in quality printing. Although high power, high laser density does not necessary conflict with the laser focusability, from a practical perspective, these lasers have a high cost per watt ratio.

FIG. 1 illustrates a flexographic printing plate. As illustrated in FIG. 1, because the flexographic plate is pressed directly on the printed media such as paper, packaging material, etc., the areas 10 which transfer ink to the printed media need to be elevated from blank areas 11 which do not transfer ink. Typically the ink transfer areas 10 require engraving at the depth of 70 microns, whereas non ink transfer areas 11 will need to be engraved to the depth of 500-700 microns. The required depth of the blank areas is such that when the flexo plate is pressed against another surface, for instance the ink carrying agent, e.g., anilox roll, and subsequently on the printed media, these blank areas will be kept out of contact with other surfaces.

In printing, a plate is pressed firmly against another surface, such as packaging. Because a flexo plate is deformable, imaging features separated by large blank areas will be deformed more strongly. As a result, large blank areas will be pushed towards the contact surface more strongly than small blank areas. This is depicted schematically in FIG. 2, where the applied pressure 20 pushes large blank area 21 more strongly than small blank area 22 towards press contact surface 23. Therefore, large blank areas must maintain greater depth than small areas, sufficient to prevent contact with the contact surface. To summarize the above, it follows that fine blank areas can be engraved by the laser system to a shallower relief than that required for large areas.

In graphic arts large, blank areas are identified to produce large non ink areas when printed. The regions with small blank areas correspond to fine detail areas when printed. The energy required to engrave a flexographic plate area, equivalent of 1 square centimeter in a depth of 1 micron is about 0.45 Joule. Typical electrical power required for removing flexographic plate non ink transfer areas 11 will be on the order of 1000 of watts whereas, ink transfer areas 10 will need about 200 watts. The ratio of the above electrical consumption correlates to the depths of ink transfer areas 10 and non ink transfer areas 11, 70 micron for ink transfer areas 10 and 500-700 microns for areas 11.

The engraving process of flexographic plate production generates large amount of debris. This creates a challenge to remove the generated debris, consisting of small residual particles and emission of gas, in an effective manner. This adds extra complexity and cost to the process. The above problems are solved by the present invention.

SUMMARY OF THE INVENTION

Briefly, according to one aspect of the present invention an optical imaging apparatus for direct engraving flexographic plates comprises at least two laser sources, each emitting laser beams. A mirror or prism is placed in front of each of the laser sources to alter an optical path of each of the laser beams. The laser beams cut the flexographic plate at different depths and cut out chunks of the flexographic plate.

The engraving by slicing system ("EBS") according to the present invention takes advantage of the fact that while large solid areas need to be processed by the laser to a certain depth relief, fine detail areas can be processed to significantly shallower relief.

DETAILED DESCRIPTION OF THE INVENTION

The present invention describes an engraving by slicing printing head capable of engraving printing blocks, such as flexographic plates, gravure cylinders and letter press cylinders. Flexographic plates will be used in the examples and throughout the detailed description, although other types of plates may be cut according to the present invention. The present invention suggests several configurations, dependent upon the arrangement of an engraving device, described below.

Figure 1:
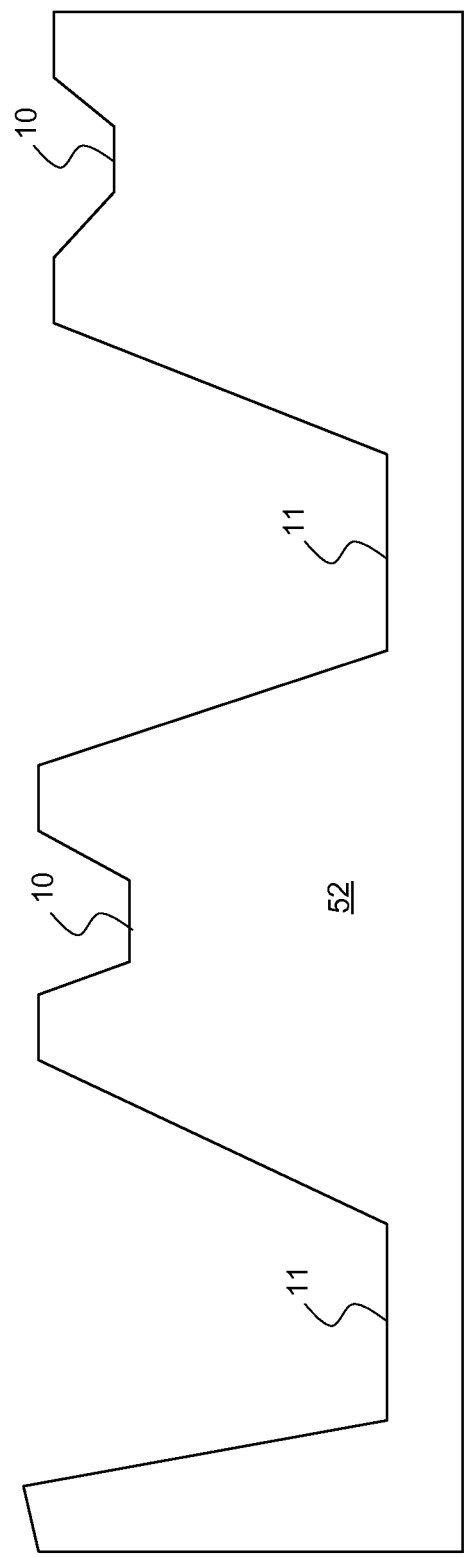
FIG. 1 is a prior art schematic illustrating a relief in a flexographic plate showing elevated ink transfer areas and blank areas.
Figure 2:
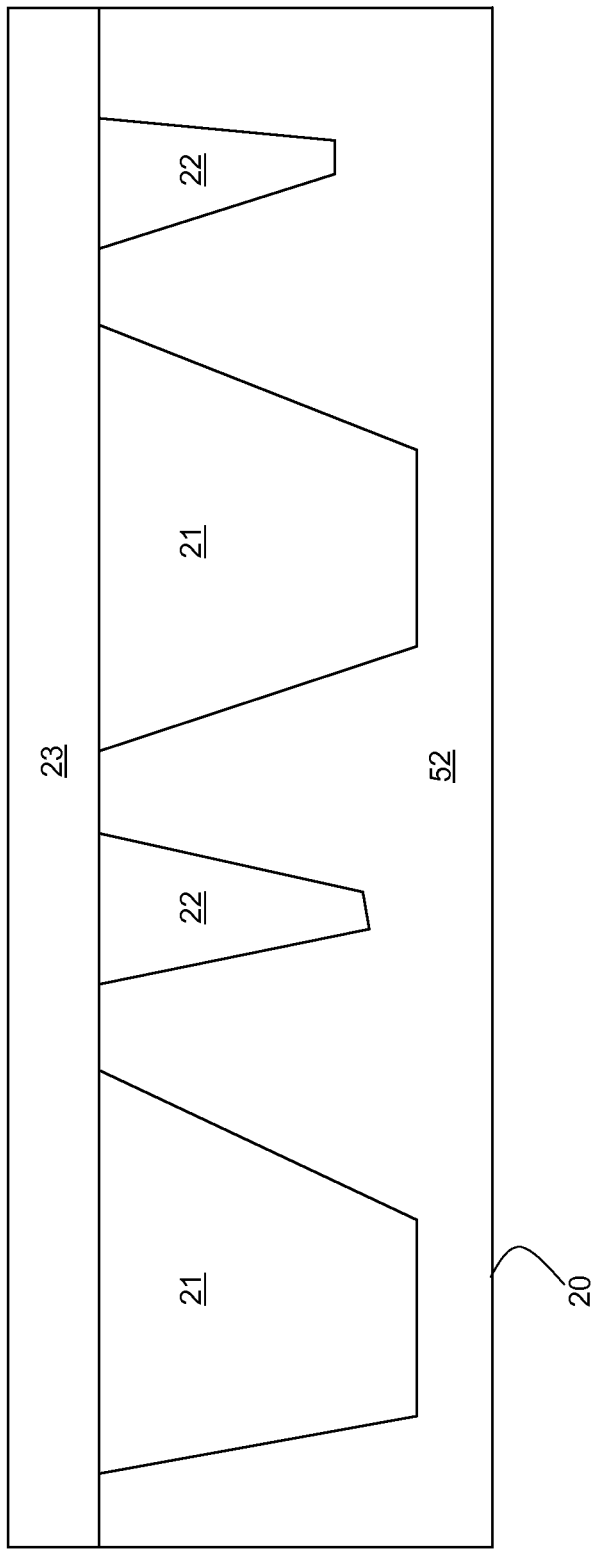
FIG. 2 is a prior art schematic illustrating a flexographic plate pressed against a surface. Columns separated by large blank areas are deformed more strongly, and, as a result, large blank areas are noticeably pushed towards the contact surface.
Figure 3:
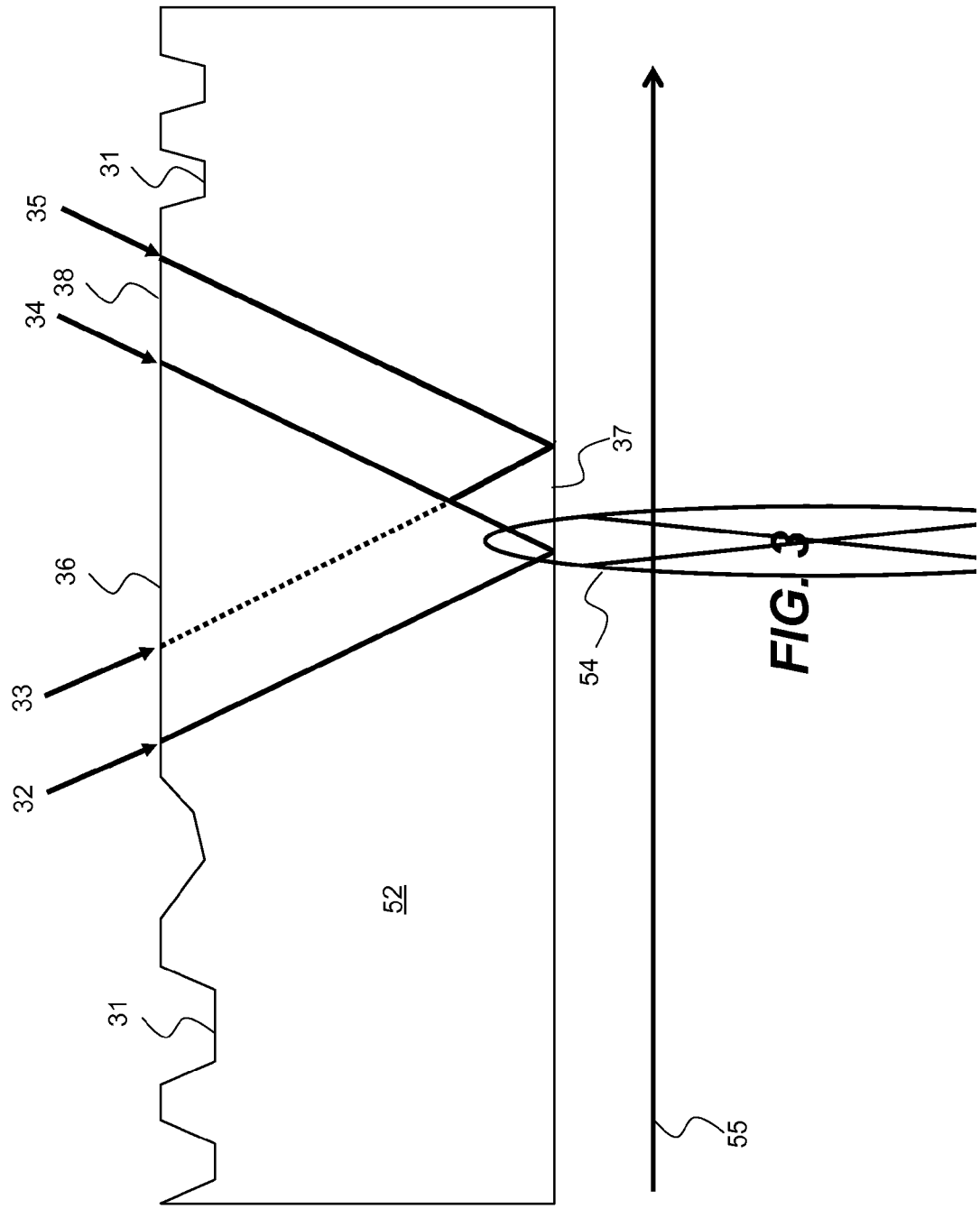
FIG. 3 is a schematic layout of engraving by slicing according to the present invention.

The present invention suggests using known laser engraving means to engrave in a 3D fashion all the ink transfer areas 31 of the flexographic plate as is illustrated by FIG. 3. The removed non ink transfer chunks 36 and 38 are treated in a different manner. The laser power is applied in 2D manner instead of in 3D. Laser beams 32 and 34 are applied on the flexographic plate to engrave into the plate in two directions 32 and 34 to cut a chunk of the removed non ink transfer area 36 out of the flexographic plate, while the plate is rotating on the drum in the fast scan direction 54, with surface motion vertical to the laser beams. The laser beams are further applied at a determined delta step in the slow direction 55 to cut another chunk as is illustrated in FIG. 3, by applying laser beams 33 and 35 in order to cut out non ink transfer chunk 38, leaving a relative small residual chunk 37, due to the 2D engraving constraints of the suggested invention. The cut non ink transfer chunks 36 and 38 will be removed in one piece from the rotating drum at which the flexographic plate is mounted, due to the drum revolution.

This invention introduces two major advantages to the flexographic plate production. The first is a substantial saving in the energy required to ablate the whole deep non ink transfer areas of a flexographic plate, such as removed non ink transfer chunks 36 and 38. The energy saving in engraving these areas can amount to 90%.

The second advantage lies in the fact that non ink transfer chunks such as 36 and 38 will be removed in relatively large pieces, as opposed to the large quantities of small particles and emitted gas, which is generated by the 3D laser ablation process. The proposed method will immensely simplify the debris removal process from the engraving device.

Figure 4:
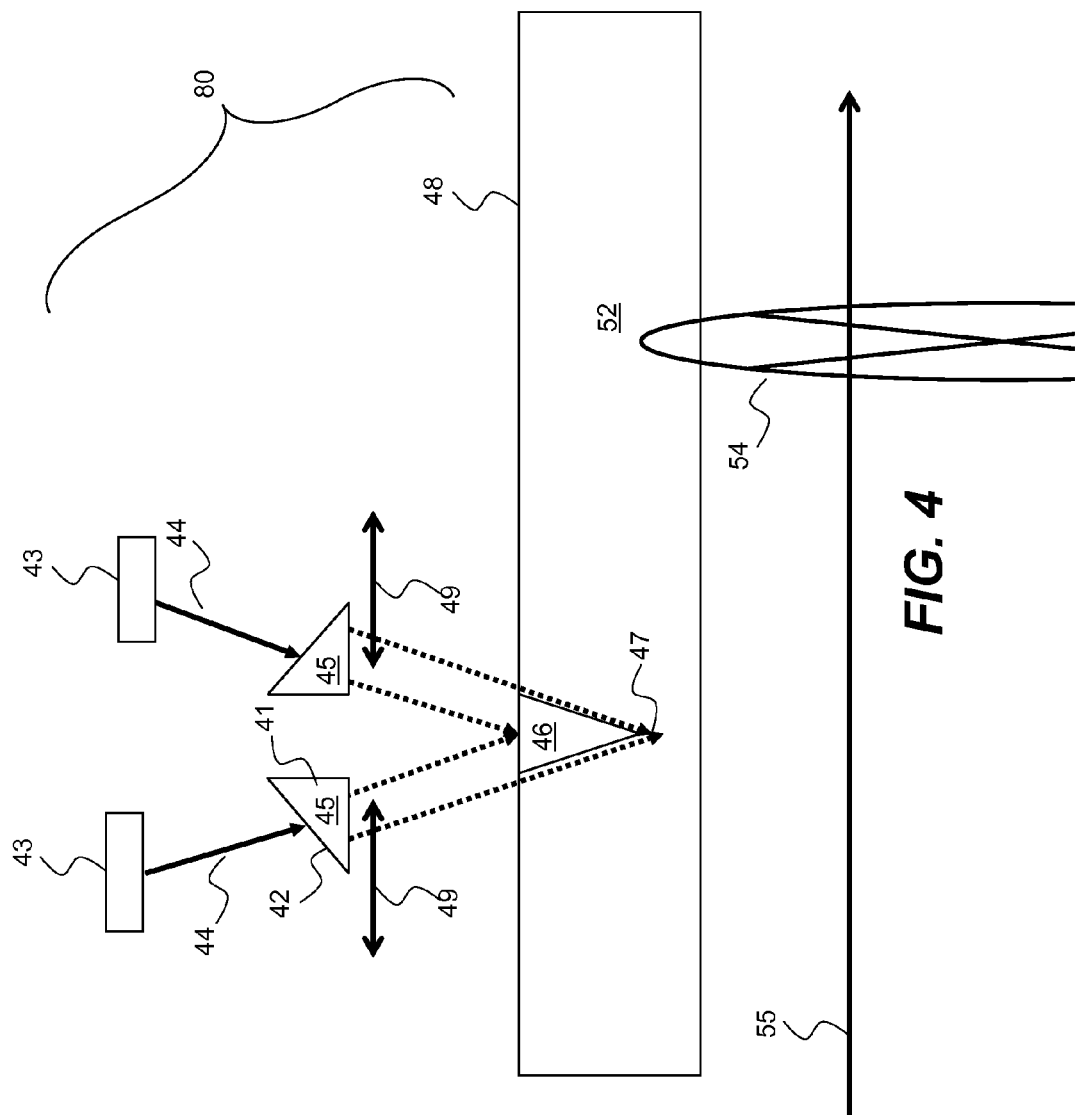
FIG. 4 is a schematic illustrating an engraving by slicing optical system.
Figure 5:
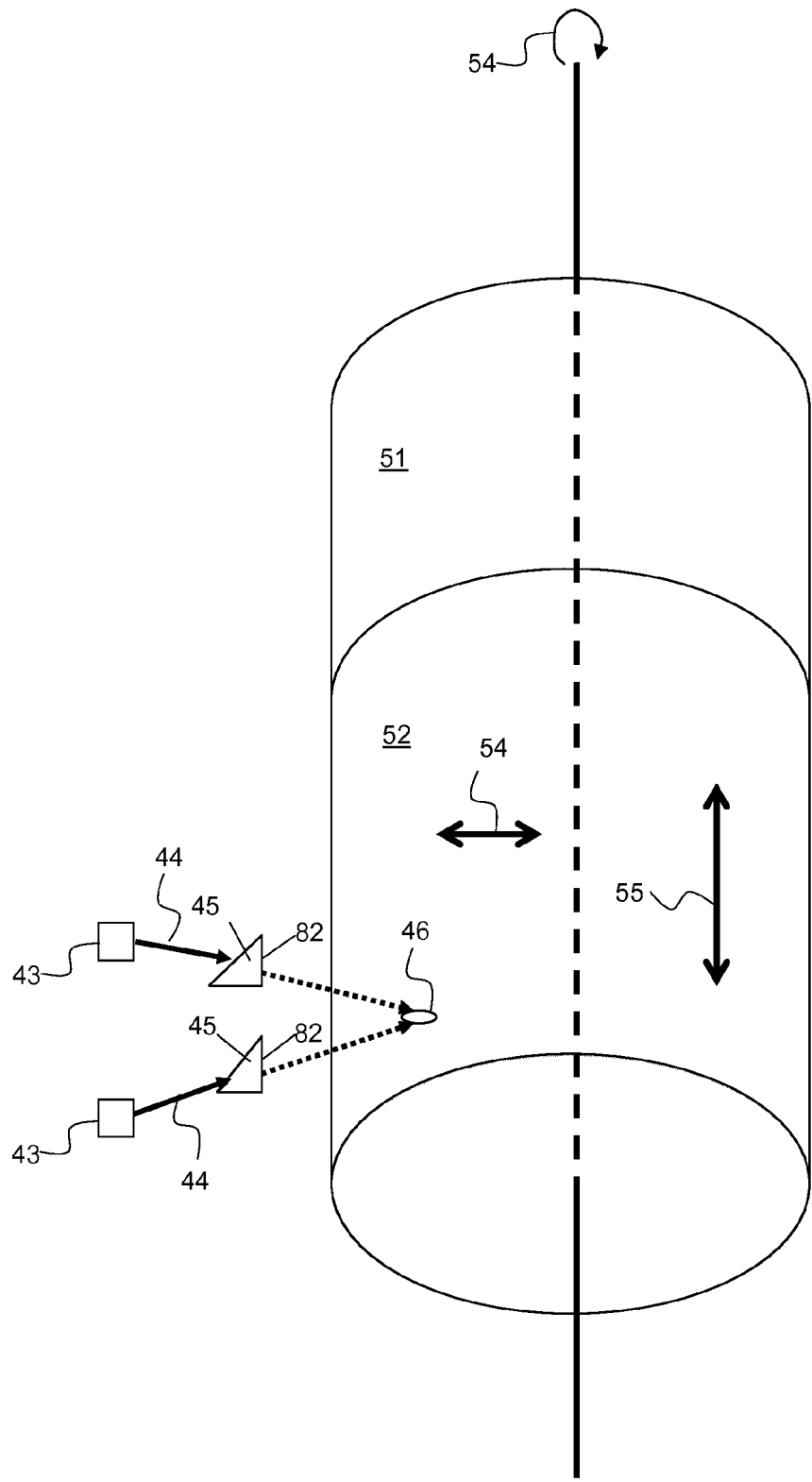
FIG. 5 is a schematic layout of engraving by slicing concept with two laser systems.

FIGS. 4 and 5 illustrate the optical imaging apparatus 80 according to the present invention, comprising laser sources 43 and mirror or prisms 45. Laser sources 43 emit two laser beams 44, from two adjacent locations to form a triangle shape when the two laser beams 44 meet on the plate surface 48 or inside the plate at the deepest cut point 47. In order to change the depth of laser beam 44 entrance into the plate 52 a glass triangular wedge prism 45 is introduced. The triangular wedge prism 45 moves in direction 49, when beams 44 hit the wide part 41 of the triangular wedge prism 45, laser beams 44 diffracts, thus enlarging the optical path, so the laser beams 44 will reach the plate surface 48. When laser beams 44 hit triangular wedge prism 45 in the triangle wedge narrow part 42 of the triangular wedge prism 45, it will propagate and enter into flexographic plate 52 into the deepest cut point 47. Laser beams 44 that will hit triangular wedge prism 45 in between triangle wedge wide part 41 and triangle wedge narrow part 42 will enter into flexographic plate 52 in between plate contact surface 48 and the deepest cut point 47. Beams intensity is adjusted during the process. The beams penetration into the material will be stopped, at the stage where the pair of beams will reach to the crossing point. Note, mirrors may be used as an alternative to the prisms.

The triangular wedge prism 45 is placed in front of the laser source 43 at the triangle wedge wide part position 41, prior to entering into the flexographic plate 52. In order to perform the entrance and cut the flexographic plate 52 the wedge is moved relative to the laser source till it is placed in front of the narrow part 42 of the wedge. At the stage when the deep cut is performed, the wedge will not move to form a continuous large cut. At the stage when the laser beams should exit the plate, the triangular wedge prism 45 will be moved till the triangle wedge wide part 41 of the wedge is placed in the front of the laser source 43. This operation will form a cut chunk 46 to be removed from the plate by the act of the rotation of the drum. An alternative method to the triangle wedge prism 45, in order to diffract the laser beams 44 optical path can be applied by a mirror system. The optical diffraction means such triangular wedge prism 45 can be introduced just in front of a single laser source 43, whereas the other laser source will be focused to the maximal depth in the plate material, this will result in a different shape of the cut chunk to be removed 46. Note also that while the examples show the prisms or mirrors moving laterally with respect to each other, they may also be rotated or tilted to achieve a similar effect. Movement or rotation of mirrors or prisms 45 may be accomplished by conventional means known in the art and represented schematically by movement mechanism 82.

Figure 6:
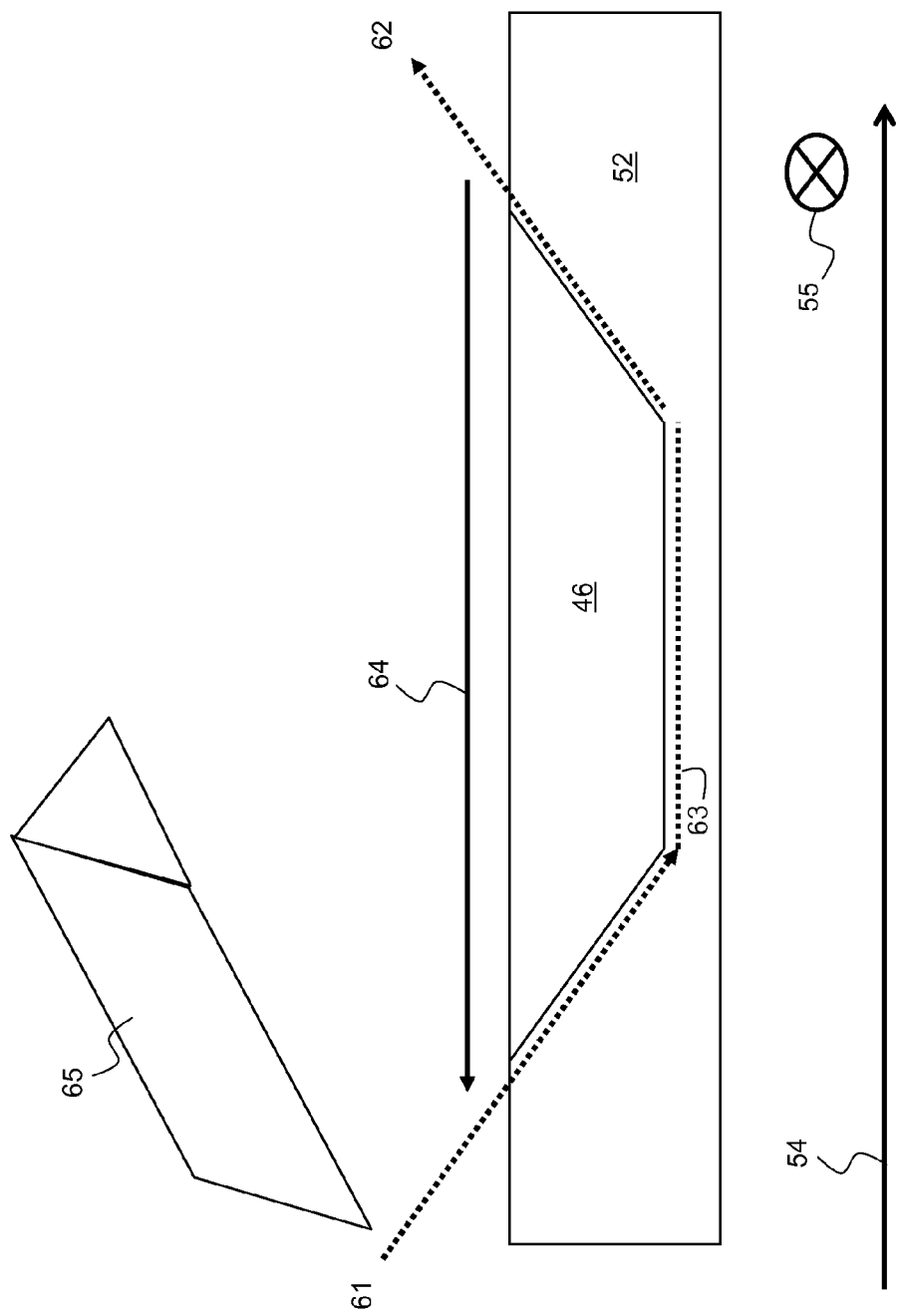
FIG. 6 is a schematic illustrating a part from a flexographic plate cut out by the engraving by slicing system.

FIG. 6 shows the laser beam entrance position 61 into flexographic plate 52, till it hits the deepest cut point 47. The flexographic plate 52 mounted on the rotating drum 51 is moving in direction 64, thus causing the laser sources 43 to cut inside the flexographic plate 52 in the direction of the plate horizontal movement 63. At the point the cut is finalized the laser beam will exit the plate via exit position 62. This will form a cut chunk 65, illustrated in a 3D view.

Figure 7:
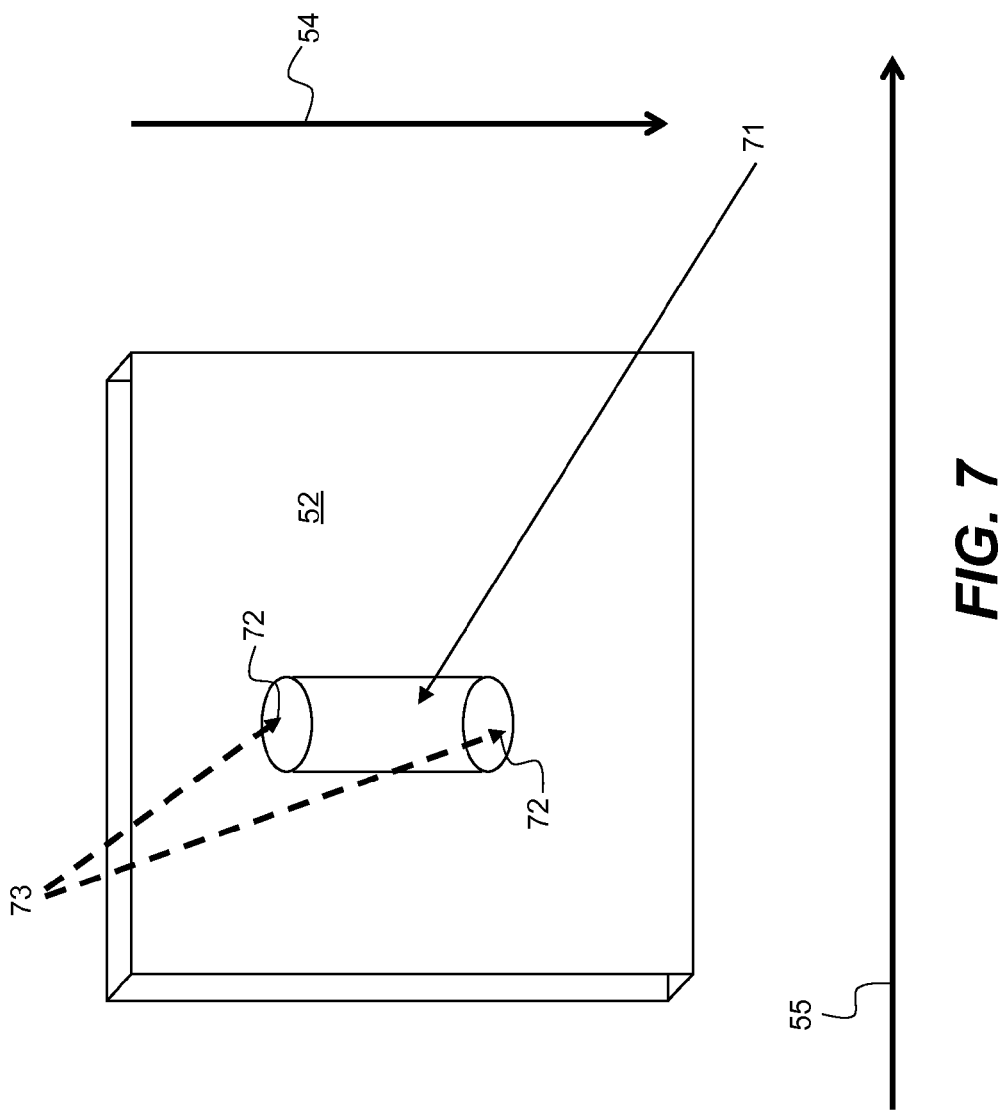
FIG. 7 is a schematic illustrating cutting a part from a flexographic plate by the engraving by slicing system, wherein the entrance and exit areas are ablated (not cut) by a laser pulse.
Figure 8:
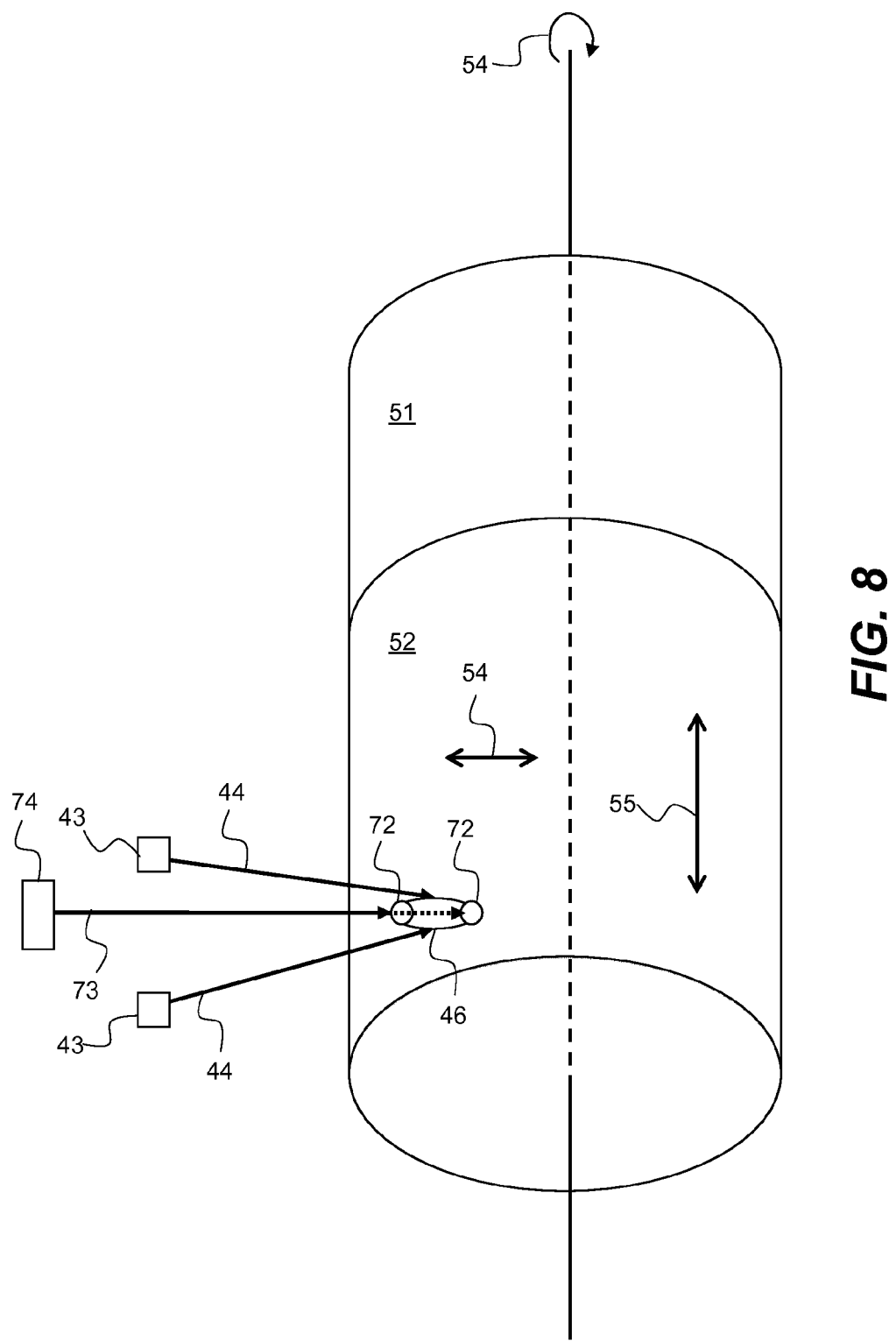
FIG. 8 is a schematic layout of engraving by slicing, including a third laser for ablating entrance and exit areas.

FIGS. 7 and 8 show another embodiment for engraving into the flexographic plate 52. The pair of laser sources 43 are used without triangular wedge prism 45, the laser sources 43 are focused to the maximal depth of the plate material. This will result in cutting to the deepest cut point inside, to form main cut chunk area 71. In addition a high power pulse laser source 74 is deployed to ablate the entrance and the exit of the chunk area 71. The entrance and exit areas 72 will be ablated by the pulse laser beams 73 from pulse laser source 74.

The invention has been described in detail with particular reference to certain preferred embodiments thereof, but it will be understood that variations and modifications can be effected within the scope of the invention.

PARTS LIST 10 ink transfer areas
11 non ink transfer areas
20 applied pressure
21 large blank areas
22 small blank areas
23 press contact surface
31 ink transfer areas
32 laser beam to cut chunk 36
33 laser beam to cut chunk 36
34 laser beam to cut chunk 38
35 laser beam to cut chunk 38
36 removed non ink transfer chunk
37 residual non ink transfer area not removed
38 removed non ink transfer chunk
41 triangle wedge wide part
42 triangle wedge narrow part
43 laser sources
44 laser beams
45 triangle wedge prism (or mirror)
46 cut chunk to be removed
47 deepest cut point
48 plate surface
49 prism movement direction
51 drum
52 flexographic plate
54 fast scan direction (or drum rotation axis)
55 slow scan direction
61 laser beam entrance position into plate
62 laser beam exit position from plate
63 laser beam horizontal movement
64 plate movement direction
65 cut chunk—3D view
71 main cut chunk area
72 ablated area created by pulse laser for the plate entrance and exit parts
73 pulse laser beams 74 pulse laser source
80 optical imaging apparatus
82 movement mechanism

The invention claimed is:

1. An optical imaging system for direct engraving of flexographic plates, comprising:
at least two laser sources each configured to emit laser beams;
a mirror or prism placed in front of at least one of said at least two laser sources configured to alter an optical path of each of said laser beams;
wherein a main optical axis of at least one of said laser beams is not perpendicular with respect to a surface of the flexographic plate and said laser beams intersect with each other at a predetermined engraving depth within the flexographic plate;
wherein said laser beams are configured to cut said flexographic plate at different depths; and
wherein said optical system is configured to cut out pieces of said flexographic plate.

2. The system of claim 1 wherein said prism is a triangular glass wedge.

3. The system of claim 1 wherein said mirrors or prisms move in unison, closer together or further apart, to cut out said pieces.

4. The system of claim 1 wherein said laser beams cut said flexographic plate in a fast scan direction.

5. The system of claim 1 wherein said mirrors or prisms tilt to cut out said pieces.

6. An optical imaging system for direct engraving of flexographic printing plates, comprising:
a first and second laser source configured to emit first and second laser beams wherein a main optical axis of each of said laser beam is not perpendicular with respect to a surface of the flexographic plate and each engraved path produced by said first and second laser beam intersects with each other at a planned engraving depth;
a third laser configured to ablate an entrance and an exit path into said flexographic plate;
wherein said first and second laser beams are focused deeper than said entrance and exit path, inside the said flexographic plate; and
wherein said system is configured to cut pieces of said flexographic plate in between said entrance and said exit path.

7. An optical imaging system for direct engraving of printing plates, comprising:
a first laser source emitting a first laser beam for cutting said printing plate;
a second laser source emitting a second laser beam for cutting said printing plate;
a first redirection means in front of said first laser source configured to alter an optical path of said first laser beam;
a second redirection means in front of said second laser source configured to alter an optical path of said second laser beam;
movement element adapted to move said first and second redirection means relative to each other to cause said first and second laser beams to intersect at different depths inside said printing plate; and
wherein an optical axis of at least one of said laser beams is not perpendicular to a surface of the flexographic plate.

* * * * *